United States Patent Office 2,947,664
Patented Aug. 2, 1960

2,947,664
SALTS OF 7-CHLORO-4-(4-DIETHYLAMINO-1-METHYLBUTYLAMINO) QUINOLINE

Charles F. Geschickter, Kensington, and Leonard M. Rice, Baltimore, Md., assignors to The Geschickter Fund for Medical Research, Inc., Washington, D.C., a corporation of New York No Drawing. Filed July 11, 1955, Ser. No. 521,372

6 Claims. (Cl. 167—58)

The present invention relates to novel organic compounds and particularly to novel salts of 7-chloro-4-(4-diethylamino-1-methylbutylamino) quinoline and the therapeutic utility thereof.

As disclosed and claimed in copending applications Serial No. 251,980, filed October 18, 1951, now abandoned, and Serial No. 378,422, filed September 3, 1953, now Patent No. 2,721,867, certain quinoline derivatives are highly effective in the treatment of asthma, hayfever, and similar allergic diseases. It has been discovered that certain salts of another quinoline derivative also similarly effective, are readily absorbed in the body, and have a long-lasting and cumulative effect.

Accordingly, it is an object of the present invention to provide novel quinoline salts which are readily absorbed and have prolonged, cumulative effectiveness in the treatment of asthma, hayfever, and similar allergenic disorders.

A further object of the invention is the provision of highly effective therapeutic agents for the treatment of allergenic disorders which comprise novel quinoline salts and particularly the ascorbic acid, nicotinic acid, and quininic acid salts of 7 chloro-4-(4-diethylamino-1-methylbutylamino) quinoline, known as chloroquin.

The 4 amine quinolines have been employed heretofore as antimalarials but not in the treatment of allergenic disorders. Furthermore, these compounds have not been used in any of the forms most suitable and effective in chemotherapy.

Following are examples of the novel, therapeutically effective salts encompassed by the present invention.

EXAMPLE 1

*Ascorbic acid salt of chloroquin*

To prepare this salt, 3.52 grams (0.02 mole) of ascorbic acid dissolved in 100 ml. of methanol was placed in a 500 ml. flask fitted with a condenser. To this was added 3.2 grams (0.01 mole) of chloroquin dissolved in 25 ml. of methanol. The mixture was refluxed for one hour and the methanol distilled off from a water bath. The residue was dried under vacuum and thus obtained as a free flowing powder very soluble in water. A 10% aqueous solution is neutral.

Following are additional examples of the salts prepared according to the procedure of Example 1:

| Example | Compound |
|---|---|
| 2 | Quininic acid salt of chloroquin. |
| 3 | Nicotinic acid salt of chloroquin. |

For oral administration the salts are given in 50 mg. capsules, once or twice daily. For parenteral administration, the salt may be dissolved in water, benzyl alcohol and dioctyl solution or a suitable oil, usually about 100 to 120 mg. per cc. and injected intramuscularly. The recommended dosage is about ½ cc. daily for one week and then every other day or weekly as indicated by the response to the treatment. The salts are absorbed more rapidly than they are excreted and as a result, the effects are long-lasting and cumulative.

From the foregoing description of certain exemplary compounds it will be apparent that novel and improved therapeutic compounds fulfilling the objects of the invention have been disclosed.

The invention may be embodied in other specific compounds, however, without departing from the spirit or essential characteristics thereof. The compounds disclosed herein are therefore to be considered in all respects as illustrative and not restrictive, the scope of the invention being indicated by the appended claims rather than by the foregoing description, and all compositions which come within the meaning and range of equivalency of the claims are therefore intended to be embraced therein.

What is claimed and desired to be secured by United States Letters Patent is:

1. A method of treating allergic disorders in humans comprising the chemotherapeutic administration of at least one of the salts defined in claim 3.
2. A novel therapeutic agent for parenteral administration in the treatment of allergenic disorders comprising at least one of the salts defined in claim 3 dissolved in a vehicle suitable for injection selected from the group consisting of water, oils and benzyl alcohol and dioctyl solution.
3. As a novel composition of matter, a compound selected from the group consisting of 7-chloro-4-(4-diethylamino-1-methylbutylamino) quinoline salts of an acid selected from the group consisting of ascorbic acid, quininic acid and nicotinic acid.
4. As a novel composition of matter the ascorbic acid salt of 7-chloro-4-(4-diethylamino-1-methylbutylamino) quinoline.
5. As a novel composition of matter, the quininic acid salt of 7-chloro-4-(4-diethylamino-1-methylbutylamino) quinoline.
6. As a novel composition of matter, the nicotinic acid salt of 7-chloro-4-(4-diethylamino-1-methylbutylamino) quinoline.

References Cited in the file of this patent
UNITED STATES PATENTS 2,719,848 Geschickter _____ Oct. 4, 1955
2,721,867 Geschickter _____ Oct. 25, 1955